April 23, 1935.  A. G. F. WALLGREN  1,998,888
BEARING
Filed March 3, 1931
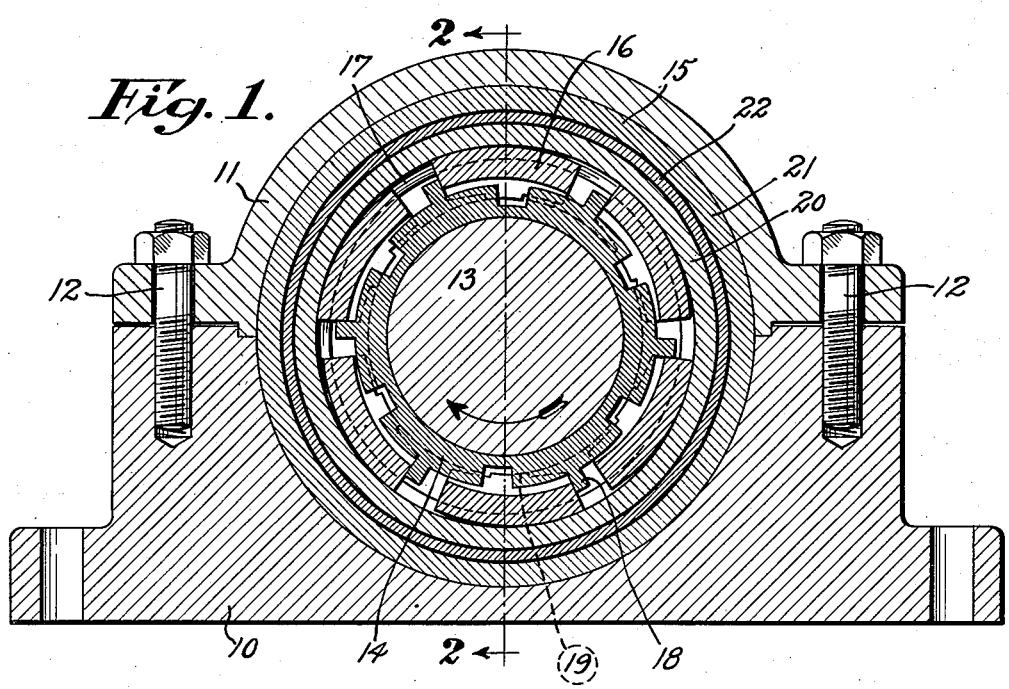
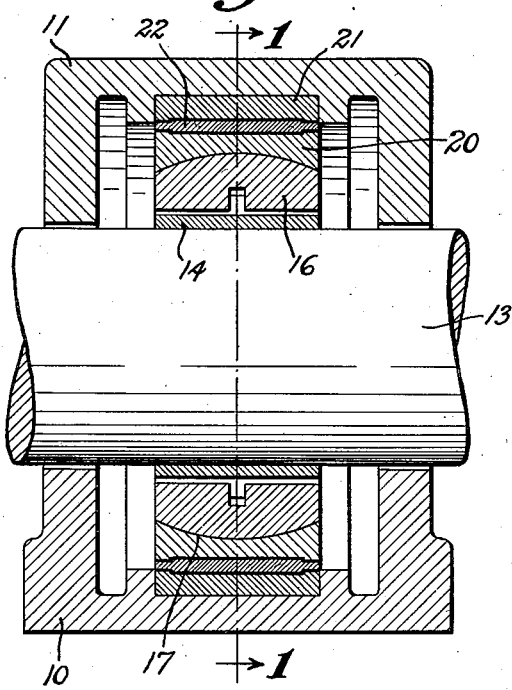
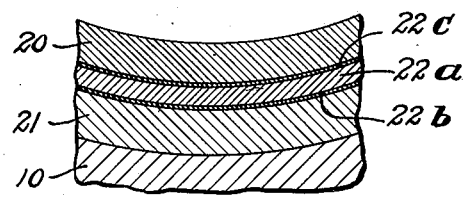
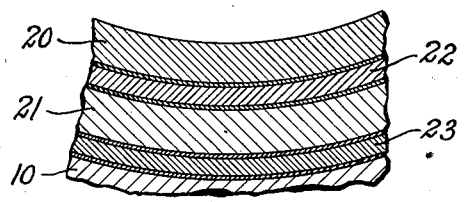
INVENTOR
August Gunnar Ferdinand Wallgren
BY
His ATTORNEY Patented Apr. 23, 1935

1,998,888

UNITED STATES PATENT OFFICE 1,998,888

BEARING

August Gunnar Ferdinand Wallgren, Stockholm, Sweden, assignor to Aktiebolaget Nomy, Stockholm, Sweden, a corporation of Sweden Application March 3, 1931, Serial No. 519,774
In Germany March 5, 1930

9 Claims. (Cl. 308—237)

My invention relates to bearings, particularly of the radial type, and is applicable to various different kinds of bearings such as plain journal bearings, sliding block bearings, ball bearings, etc.

The principal object of the invention is to provide improved means for electrically separating parts of the bearings to prevent the flow of electric current through the bearing from the inner part, such as the journalled shaft, to the outer part of the bearing or to the bearing foundation, or vice versa. For the purposes of the present invention, parts such as the journal portion of the shaft and the bearing foundation are to be considered as parts of the bearing.

I accomplish the above object by providing one or more insulating layers within the bearing, which insulating layer or layers are of such nature that they serve to electrically separate the parts of the bearing and also are adapted to readily transmit heat and to withstand relatively high temperatures without deterioration.

More specifically the above object is attained by providing one or more such insulating elements having surface which is chemically treated to render it electrically non-conductive.

The more detailed objects of the invention and its nature may best be understood from the following description of one form of the invention as shown by way of example in a radial bearing of the sliding block type.

In the accompanying drawing forming a part of this specification:

Fig. 1 is a transverse section through a bearing of the sliding block type which embodies the invention;

Fig. 2 is a longitudinal section taken on the line 2—2 of Fig. 1;

Fig. 3 is a detail on an enlarged scale of part of the structure shown in Fig. 1; and Fig. 4 is a transverse section of a part of a modified bearing structure.

Referring now to the drawing, the bearing shown in Fig. 1 is comprised of a lower supporting part 10 and cap 11 secured to part 10 by means of suitable studs 12. Shaft 13 has secured thereto an inner annular bearing member 14 while the parts 10 and 11 serve to secure an outer annular bearing member indicated generally at 15. Bearing members 14 and 15 are radially spaced and have disposed between them a plurality of bearing blocks 16, the outer faces of which are spherically curved and adapted to slide with respect to a complementary spherically curved bearing surface 17 on the outer bearing member 15. The blocks 16 are adapted to be rotated by the inner bearing member 14, the latter member being provided with driving abutments 18 and irregular supporting surfaces 19 disposed in such manner as to cause the blocks to assume a tilted position upon rotation for the formation of a wedge-shaped load sustaining oil film between the blocks and the outer bearing member.

The above described type of bearing is fully disclosed in my copending application Serial No. 277,769, filed May 14, 1928, Pat. No. 1,871,485, but it is to be understood that this type of bearing is illustrated herein by way of example only and that the invention is not in any way limited to the specific type of bearing shown.

In the present embodiment of the invention the outer bearing member 15 comprises two annular rings 20 and 21 having between them an element 22 forming an insulating layer. Rings 20 and 21 and element 22 are preferably assembled so that the outer bearing member 15 formed thereby comprises an inseparable member. The manner of assembling may be varied and different known methods may be employed, such, for example, as pressing or shrinking the parts together. These parts also are preferably formed with cooperating recesses and shoulders or the like to prevent relative axial displacement of the parts. By this or other suitable arrangement, the insulating element may be incorporated in a bearing adapted to take axial thrust.

In order to conduct heat due to friction or other cause from the bearing it is desirable that the insulating element comprise material adapted to readily conduct heat, and it is further desirable to have the material in the insulating element of such nature that it will withstand relatively high temperatures without deterioration.

In accordance with the present invention the insulating element is made of material having the above characteristics and having surface which is made electrically non-conductive through the medium of chemical treatment. In order to secure the desirable characteristic of heat conductivity, I prefer to make the body portion of the element 22 (indicated at 22a in Fig. 3) of metal such as aluminum, and I secure the necessary insulating characteristic in the element by providing it with chemically treated surface such as 22b and/or 22c. Such chemically treated surface may advantageously be obtained by the electro-chemical deposition of some form of silicious material, such as water glass or the like, which material is capable of withstanding high temperatures without deterioration.

Obviously the insulating layer need not be in a single piece as illustrated in the form shown by way of example, but may be made in the form of a longitudinally parted cylinder. Likewise, in cases where the bearing requires insulation against high tension currents a plurality of elements may be employed as illustrated in the modification shown in Fig. 4, in which, in addition to the insulating element 22 between the rings 20 and 21, a second insulating element 23 is interposed between the outer annular member and the part of the bearing forming the support.

While I prefer to place the insulating element or elements between stationary parts of the bearing, as shown in the examples illustrated, this location is not essential to the practice of the invention and one or more insulating elements may be interposed between parts of the bearing which rotate. For example, the inner bearing member 14 may be divided in the same manner as has been illustrated with respect to the outer bearing member 15, or an insulating layer may also be placed between the inner bearing member 14 and the shaft 13.

From the foregoing description it will be apparent that numerous changes and modifications may be made within the scope of the invention, which is to be considered as embracing all forms of apparatus falling within the scope of the appended claims.

What I claim is:

1. In a bearing, a bearing member comprising an outer annular ring portion, an inner annular ring portion, the outer diameter of the inner portion being less than the inner diameter of the outer portion, an intermediate relatively thick ring of metal having a high coefficient of heat conductivity between said annular ring portions, and a relatively thin coating of silicious material intimately associated with said intermediate ring between said intermediate ring and one of said annular ring portions.

2. In a device of the class described, two groups of concentric elements, one group being rotatable relative to the other group, the elements of each group being relatively stationary with respect to each other, one of said groups comprising an intermediate element constituting an electrical insulating member, said member comprising a relatively thick body portion of aluminum having a relatively thin deposit thereon of silicious material.

3. In a bearing, a ring element including an outer annular ring portion, an inner annular ring portion, the outer diameter of the inner portion being less than the inner diameter of the outer portion, and means for rigidly securing said ring portions together, for conducting heat between said ring portion and for electrically insulating said ring portions from each other, said means comprising an intermediate relatively thick ring of metal between said ring portions having a high coefficient of heat conductivity and having a relatively thin coating of electrical insulating material intimately associated therewith and between said intermediate ring and one of said annular ring portions.

4. In a bearing, a ring element including an outer annular ring portion, an inner annular ring portion, the outer diameter of the inner portion being less than the inner diameter of the outer portion, and means for rigidly securing said ring portions together, for conducting heat between said ring portion and for electrically insulating said ring portions from each other, said means comprising an intermediate relatively thick ring of metal between said ring portions having a high coefficient of heat conductivity and having a relatively thin coating of electrical insulating material on, and intimately associated with, the inner and outer surfaces of said intermediate ring between said intermediate ring and the inner and outer annular ring portions, respectively.

5. In a bearing, a ring element including an outer annular ring portion, an inner annular ring portion, the outer diameter of the inner portion being less than the inner diameter of the outer portion, means for rigidly securing said ring portions together, for conducting heat between said ring portions and for electrically insulating said ring portions from each other, said means comprising an intermediate relatively thick ring of metal between said ring portions having a high coefficient of heat conductivity and having a relatively thin layer of electrical insulating material between said intermediate ring and one of said annular ring portions, and means for preventing displacement of said intermediate ring with respect to said annular ring portions.

6. In a bearing, a ring element including an outer annular ring portion, an inner annular ring portion, the outer diameter of the inner portion being less than the inner diameter of the outer portion, means for rigidly securing said ring portions together, for conducting heat between said ring portions and for electrically insulating said ring portions from each other, said means comprising an intermediate relatively thick ring of metal between said ring portions having a high coefficient of heat conductivity and having a relatively thin layer of electrical insulating material between said intermediate ring and one of said annular ring portions, and shoulders on said intermediate ring cooperating with recesses in said annular ring portions for preventing displacement of said intermediate ring with respect to said annular ring portions.

7. In a device of the class described, two groups of concentric elements, one group being rotatable relative to the other group, the elements of each group being relatively stationary with respect to each other, one of said groups including intermediate means for rigidly securing other elements of said group together, for conducting heat between other elements of said group and for electrically insulating other elements of said group from each other, said intermediate means comprising a relatively thick body portion of material having a high coefficient of heat conductivity and having a relatively thin coating of electrical insulating material thereon.

8. In a bearing, a ring element including an outer annular ring portion, an inner annular ring portion, the outer diameter of the inner portion being less than the inner diameter of the outer portion, and means for rigidly securing said ring portions together, for conducting heat between said ring portions and for electrically insulating said ring portions from each other, said means comprising an intermediate relatively thick ring of metal between said ring portions having a high coefficient of heat conductivity and having a relatively thin electro-chemical deposit of electrical insulating material thereon and intimately associated therewith.

9. In a bearing, a ring element including an outer annular ring portion, an inner annular ring portion, the outer diameter of the inner portion being less than the inner diameter of the outer portion, and means for rigidly securing said ring portions together, for conducting heat between said ring portions and for electrically insulating said ring portions from each other, said means comprising an intermediate relatively thick ring of metal between said ring portions having a high coefficient of heat conductivity and having a relatively thin electro-chemical deposit of electrical insulating material on, and intimately associated with, the inner and outer surfaces of said intermediate ring between said intermediate ring and the inner and outer annular ring portions, respectively.

AUGUST GUNNAR
FERDINAND WALLGREN.